July 26, 1966  E. O. KOLLMORGEN  3,262,364
PERISCOPE
Filed May 4, 1961
FIG.I.
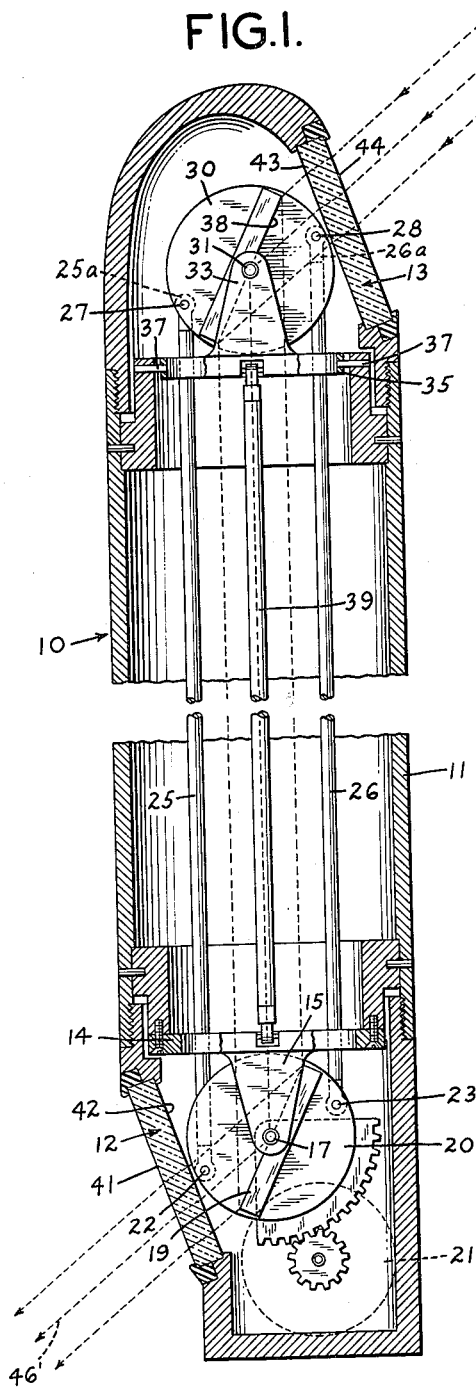
FIG.2.
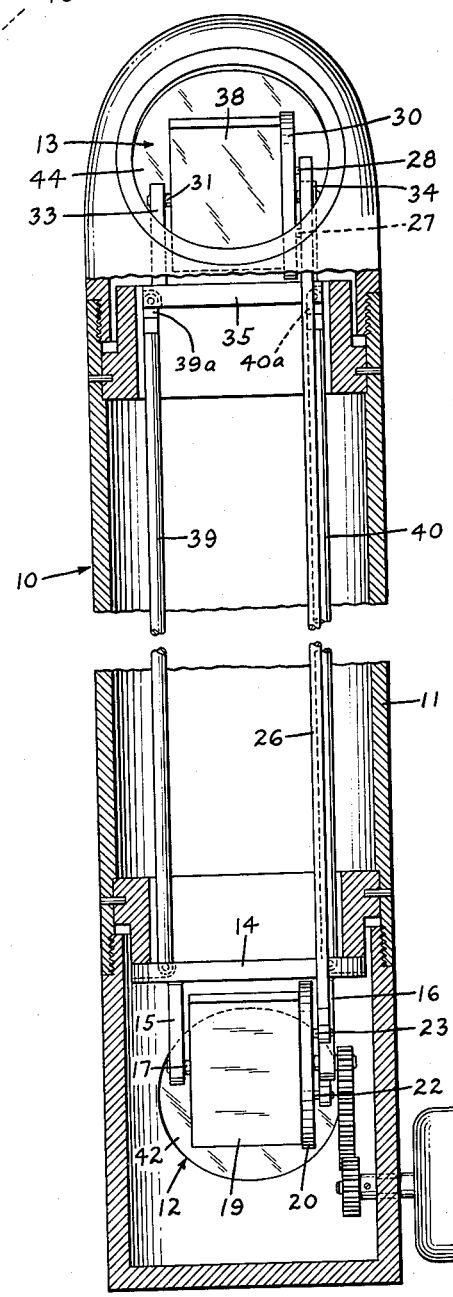
INVENTOR
ERNST O. KOLLMORGEN
BY
Brumbaugh, Free, Graves & Donohue
HIS ATTORNEYS United States Patent Office 3,262,364
Patented July 26, 1966

3,262,364
PERISCOPE
Ernest O. Kollmorgen, Amherst, Mass., assignor to Kollmorgen Corporation, Northampton, Mass., a corporation of New York
Filed May 4, 1961, Ser. No. 107,673
7 Claims. (Cl. 88—68)

The present invention relates to periscopes and, more particularly, to a navigational periscope having a novel structure including means for maintaining its upper and lower reflectors in parallel relation, regardless of their angle of elevation.

Observation of the stars is still an important part of seamanship, but it has the disadvantage so far as submarines are concerned of requiring them periodically to come to the surface. Before the development of the atomic submarine, celestial observations could conveniently be made during the numerous periods when it was necessary for the submarine to be on the surface for other reasons. Today, however, the requirement that a submarine surface in order to observe the stars can be distinctly disadvantageous.

A step toward freeing the submarine from dependence upon celestial observations has been taken with the development of the "Ship's Inertial Navigation System" (SINS), which makes possible cruises under the Arctic ice pack and underwater firing of ballistic missiles. Nevertheless, observation of the stars remains vital as a means for monitoring the new system.

It is highly desirable that submarine personnel possess the means for making accurate celestial observations while the ship is at periscope depth. In the present state of the art, periscopes used for this purpose are supported rotatably in bearings on an axis normal to the plane of the deck of the submarine and are capable of measuring the angle of elevation of a star relative to the deck plane and the azimuth of a star relative to the longitudinal axis of the submarine. This scheme suffers from the disadvantage that, because the deck plane of a submarine at sea is in constant motion and seldom level, computing means are necessary to transform the deck-plane coordinates of elevation and azimuth into corresponding coordinates referred to a truly horizontal plane. The scheme suffers from the further disadvantage, where highly accurate celestial observations are required, that, because azimuthal measurements are generally made by rotating the periscope about its own axis, it is necessary to devise means whereby the relatively massive periscope can be supported in bearings substantially free from shake and rotational friction and servoed in train to a high order of precision.

The function of the SINS sought to be monitored is to produce a platform stabilized in space. Means for celestial observation mounted directly upon such platform would permit accurate monitoring. However, such means would be impracticable in a submerged submarine, and it has therefore been necessary to employ a conventional periscope for celestial observation notwithstanding the fact that the introduction of the deck plane as an intermediate plane of reference adds complexity and degrades the accuracy of the system.

Accordingly, it is an object of the invention to provide a novel periscope which is free of the above-noted deficiencies of conventional periscopes and adapted for observations of the stars.

It is another object of the invention to provide a periscope capable of transmitting a line of sight without deviation, regardless of the angle of elevation of the line of sight with respect to the optical axis of the periscope.

A further object of the invention is to provide means for enabling personnel on a submarine to observe the stars while at periscope depth for purposes either of navigation or of monitoring a Ship's Inertial Navigation System.

Still another object is to provide a periscope having two mirrors or reflectors capable of sufficient angular elevation to observe an adequate number of navigational stars, and novel means for keeping the mirrors in parallel relation irrespective of their angle of elevation, and despite flexing and vibration of the body tube of the periscope.

These and other objects of the invention are achieved by providing a periscope comprising two mirrors and two windows, the remaining interior space being given over to light-trapping devices, well-engineered means to maintain and check the parallelism of the movable reflecting surfaces and a servo package to actuate these surfaces simultaneously in elevation. A preferred embodiment of the new periscope includes a novel arrangement of rods linking the two mirrors so that as one mirror is elevated through a given angle, as for example by a servomotor, the other is automatically elevated in the same degree and the mirrors are maintained in parallel relation.

For an understanding of further particulars of the invention, reference is made to the figures of the accompanying drawing, in which:

FIG. 1 is a partly-sectional view in side elevation of a periscope constructed in accordance with the invention; and FIG. 2 is a partly-sectional view in front elevation of the periscope shown in FIG. 1.

FIG. 1 depicts a periscope 10 constructed in accordance with the invention and having a tubular body or tube 11 fitted with a lower window 12 and an upper window 13.

It is desirable to make the tube 11 of a lightproof construction so that no light can enter the periscope 10 except through the windows. If the periscope 10 is to be mounted on a submarine, the tube 11 and the window 13 are of a watertight construction and are further made sufficiently strong to withstand the pressures to which they will be subjected at the greatest depth to which the submarine is capable of submerging.

Within the tube 11 of the periscope 10 and in the vicinity of the lower window 12 is an annulus 14 which is rigidly secured to the tube 11 and which supports dependent arms 15 and 16. An interrupted axle 17 is connected at its outer ends to the dependent arms. A reflector or mirror having a plane reflecting surface 19 is mounted on the axle 17 so that the reflecting surface 19 is rotatable about and coplanar with the axis of the axle 17. The reflector 19 is secured to a rigid member such as a disc 20 which is rotatable with the reflecting surface 19 about the axle 17. The angular orientation of the reflecting surface 19 and the disc 20 is controllable by a servomotor 21.

Pivotally attached to the disc 20 at diametrically opposed points 22 and 23 are rods 25 and 26, respectively, which extend parallel to the optical axis of the periscope 10. The rods 25 and 26 have axially adjustable end portions 25a and 26a, respectively, to enable them to be adjusted to equal lengths and are pivotally connected at diametrically opposed points 27 and 28, respectively, to a rigid member such as a disc 30, which is disposed within the tube 11 of the periscope 10 directly above and in the plane of the disc 20 in the vicinity of the upper window 13.

The disc 30 is rotatable about the axis of an interrupted axle 31. The axle 31 is supported at its outer ends by upstanding arms 33 and 34, which are rigidly attached to an annulus 35. The annulus 35 is pivotally secured to the tube 11 by pins 37, which are 90° around the circumference of the annulus 35 from the arms 33 and 34. An upper reflector or mirror having a plane reflecting surface 38 is mounted on the axle 31 so that the reflecting surface 38 is rotatable about and coplanar with the axis of the axle 31.

The radial displacement of the point 22 from the axis of the axle 17 is equal to the radial displacement of the point 27 from the axis of the axle 31, and the radial displacement of the point 23 from the axis of the axle 17 is equal to the radial displacement of the point 28 from the axis of the axle 31. Thus, the rods 25 and 26, the line passing through points 22 and 23, and the line passing through points 27 and 28 form a parallelogram. Therefore, if the angular elevations of the reflecting surfaces 19 and 38 are originally the same they will remain so for any angle of elevation imparted by the servomotor 21 to the lower reflecting surface 19.

The axes of the axles 17 and 31 are maintained parallel to each other by means of rods 39 and 40. The rods 39 and 40 are adjustable to equal lengths by means of axially adjustable portions 39a and 40a and are pivotally connected at their lower ends to the annulus 14 and at their upper ends to the annulus 35. Accordingly, the axles 17 and 31 can be maintained parallel not only to each other, but also to a given external reference, such as the plane of a submarine's deck. Similarly, they can be maintained perpendicular to the optical axis of the periscope 10.

Inasmuch as the walls 41 and 42 of the lower window 12 are parallel to the walls 43 and 44 of the upper window 13, and the reflectors 19 and 38 are parallel to each other for any angle of elevation, a line of sight (such as the one designated 46) transmitted by the periscope 10 will emerge (as a line 46' in the example) without deviation, irrespective of its angle of elevation and despite flexing and vibration of the body tube 11 of the periscope. That is, the lines will be parallel, so that their azimuth and angular elevation will be the same.

In a preferred embodiment of the invention for installation on board a submarine, certain additional apparatus (not shown) is provided, including equipment for de-icing the head window 13 and for raising and lowering the periscope and controlling the train thereof. Training accuracies of the order of 5 minutes of arc are sufficient, so that a highly sophisticated training means is not needed. Rather, a large annular torquer or rotary ring is mounted in the overhead support for the periscope and, when the latter is fully raised, it is automatically keyed and centered in the torquer. A feedback element comprising either an "Inductosyn" or a geared synchromotor is also employed. To avoid the complication of passing the periscope hoisting rods through the torquer, a cable hoisting mechanism with sheaves mounted below the torquer is employed. This arrangement permits the use of a conventional hoisting yoke, stuffing box, periscope main bearings, and fairing.

In additional, a visual tracking telescope of conventional type is mounted at the level of the lower window 12 having an angular elevation axis passing substantially through the optical axis of the periscope 10, so that as the reflecting surfaces 19 and 38 are elevated through any angle the telescope will continue to sight along the optical axis of the periscope 10. Such a telescope is useful as a means not only of tracking stars, but also of checking the parallelism of the reflecting surfaces 19 and 38. A daytime star-tracking device such as a television receiver or a photoelectric cell may be similarly employed.

Desirably, a catadioptric system is employed for the visual telescope, since such a system is well adapted for applications requiring a large pupil and a small angular field.

Electrical circuits are brought in through an "umbilical cord"; the intermittent use of the instrument does not warrant the employment of collector rings, particularly in a region exposed to the seepage of salt water. The new periscope, by reason of the symmetrical arrangement of its windows and the absence of lenses, is insensitive to variations in the density of its internal atmosphere.

Thus, in accordance with the invention, a novel periscope is provided which is adapted to transmit a line of sight without deviation, regardless of the angle of elevation of the line of sight with respect to the optical axis of the periscope.

Inasmuch as the incoming line of sight is divorced from reference to the deck plane, there is no need for transformation of coordinates in the measurement of star positions. All angle-measuring equipment is external to the periscope and hence accessible for servicing at sea.

In terms of performance, the new periscope offers an optical system of enhanced capability in the visual or electronic tracking of nighttime and twilight stars by reason of light-gathering and transmitting power several times that hitherto attainable, improvements in light trapping, and the elimination of optical surfaces tending to degrade image quality. Further, the periscope is adapted to be trained approximately on a star by hand, since accuracy is needed sufficient only to bring the star into the field of view.

In terms of reliability, the simplicity of the periscope and of its mounting and the accessible location of all critical tracking, measuring and stabilizing components result in a navigational system less susceptible of disablement at sea. In terms of weight, bulk, and other characteristics affecting the structure of the submarine, the new periscope constitutes a distinct advantage over prior periscopes.

The embodiment described is susceptible of modification in form and detail within the spirit and scope of the invention. For example, tapes or cables under tension can be substituted for the rods 25, 26, 39 and 40. Accordingly, the invention is to be construed as including all of the modifications falling within the scope of the appended claims.

I claim:

1. A periscope comprising a distortable tube, two windows at longitudinally spaced-apart positions on said tube, a first mirror having a plane reflecting surface positioned within said tube adjacent one of said windows and pivotally mounted about a first axis fixed with respect to said tube, a second mirror having a plane reflecting surface in fixed orientation with respect to the plane reflecting surface of said first mirror and pivotally mounted within said tube adjacent the other of said windows about a second axis extending parallel to said first axis and about a third axis extending transversely of said tube and perpendicular to said first axis, and control means responsive to distortion of said tube for maintaining said reflecting surfaces in fixed orientation with respect to each other as the tube is distorted intermediate its ends.

2. A periscope comprising a distortable tube, two windows at longitudinally spaced-apart positioins on said tube, a first support member positioned within said tube intermediate said windows and in fixed orientation with respect to said tube, a first mirror having a plane reflecting surface pivotally mounted on said first support adjacent said first window about a first axis, a second support member positioned within said tube intermediate said windows and pivotally mounted with respect thereto about a second axis extending transversely of said tube and perpendicular to said first axis, a second mirror having a plane reflecting surface parallel to the plane reflecting surface of said first mirror pivotally mounted on said second support adjacent said second window about a third axis extending parallel to said first axis and perpendicular to said second axis, and control means responsive to distortion of said tube for maintaining said reflecting surface of said first and second mirrors parallel to each other as said tube is distorted intermediate its ends.

3. A periscope comprising a distortable tube, two windows at longitudinally spaced-apart positions on said tube, a first support member positioned within said tube intermediate said windows and in fixed orientation with respect to said tube, a first mirror having a plane reflecting surface pivotally mounted on said first support adjacent said first window about a first axis, a second support member positioned within said tube intermediate said windows and pivotally mounted with respect thereto about a second axis extending perpendicular to said first axis, a second mirror having a plane reflecting surface parallel to the plane reflecting surface of said first mirror pivotally mounted on said second support adjacent said second window about a third axis extending parallel to said first axis and perpendicular to said second axis, and control means for maintaining said reflecting surface of said first and second mirrors parallel to each other as said tube is distorted intermediate its ends, said control means comprising first connecting means connected to said first and second mirrors independently of said first and second support members for maintaining the planes of said reflecting surfaces in parallel relationship as either mirror pivots about either said first or third axes due to said distortion, and second connecting means connected to said support members for maintaining said first and third axes in parallel relationship as said second axis pivots about said first axis due to said distortion.

4. A periscope as set forth in claim 3 further including a servomotor for rotating said first mirror about said first axis independently of said tube distortion.

5. A periscope as set forth in claim 3 wherein said first connecting means comprises a first pair of equal length, rigid rods pivotally connected to said mirrors independently of said support members about axes extending parallel to said first and third axes, and said second connecting means comprises a second pair of equal length, rigid rod members pivotally connected to said support member about axes extending parallel to said second axis.

6. A periscope as set forth in claim 5 wherein said first and third axes lie in the plane of the reflecting surface of said first and second mirrors, respectively.

7. A periscope as set forth in claim 6 wherein said windows each include a pair of parallel light-transmitting surfaces for transmitting light to and from the interior of said tube with each of the light transmitting surfaces lying in planes parallel to said first and second axes.

References Cited by the Examiner

UNITED STATES PATENTS

| | | | |
|---|---|---|---|
| 826,155 | 7/1906 | Dudley | 88—68 |
| 1,102,046 | 6/1914 | Hanson | 88—69 |
| 1,578,958 | 3/1926 | Daoust | 88—68 |
| 2,364,670 | 12/1944 | Stamy et al. | 88—68 |
| 2,467,266 | 4/1949 | Lumsden | 88—70 |
| 2,488,239 | 11/1949 | Rattray | 88—72 |
| 2,625,853 | 1/1953 | Hayward | 88—72 |
| 2,757,575 | 8/1956 | Kovach | 88—68 |
| 3,015,249 | 1/1962 | Taylor | 88—72 |

JEWELL H. PEDERSEN, *Primary Examiner.*

E. G. ANDERSON, *Examiner.*

R. L. WIBERT, *Assistant Examiner.*